Oct. 27, 1936.  M. T. WINTSCH  2,059,161
RAIL VEHICLE SIGNAL SYSTEM
Filed Aug. 26, 1935  2 Sheets-Sheet 1

Oct. 27, 1936.                M. T. WINTSCH                2,059,161
                        RAIL VEHICLE SIGNAL SYSTEM
                         Filed Aug. 26, 1935        2 Sheets-Sheet 2

Inventor
Max Theodore Wintsch
by
Walter T. Kaufman
Attorney

Patented Oct. 27, 1936

2,059,161

UNITED STATES PATENT OFFICE 2,059,161

RAIL VEHICLE SIGNAL SYSTEM

Max Theodore Wintsch, Lancaster, Pa.

Application August 26, 1935, Serial No. 37,878

9 Claims. (Cl. 246—34)

This invention relates generally to a rail vehicle signal system and more particularly to a right-of-way and cab signal system adapted to be controlled by traffic conditions along the trackway; the control current for the right-of-way and cab signals being impressed upon the track rails and, in the preferred embodiment where alternating current is utilized, current of but a single frequency being employed for both the right-of-way and cab signal control. The invention also contemplates the interconnection of suitable speed control or braking mechanism with the cab signals.

It is an object of my invention to provide a simple system, requiring a minimum of equipment, which is effective for signalling and controlling the operation of a vehicle travelling along a trackway.

Another object of my invention is to provide a system whereby inter-connection of the cab and right-of-way signals is so effected that block to block line wires for the right-of-way signals may be eliminated, thus reducing installation costs and maintenance expenses. By means of my system, tuned relays for the right-of-way signal control may be eliminated and tuned track circuits dispensed with, thus obviating one of the major obstacles to successful signalling—interference between tuned circuits. Furthermore, with a system employing alternating current in the control circuit, a single frequency may be impressed upon the rails and a tuned circuit utilized for the cab signal control with an untuned relay for the right-of-way signal control connected in circuit with the rails and responsive to the alternating current impressed thereon. Systems now currently used employ as many as four tuned circuits to obtain the same signals as provided by my system.

According to the preferred embodiment of my invention, three indication signals are provided along the right-of-way and two signals are provided in the cab. The two cab signals are adapted to be intermittently and alternately operated to provide a third traffic indication in the cab, and timed relays are provided along the right-of-way effective for continuously operating one of the right-of-way signals when the cab signals are being intermittently operated.

Figure 1:
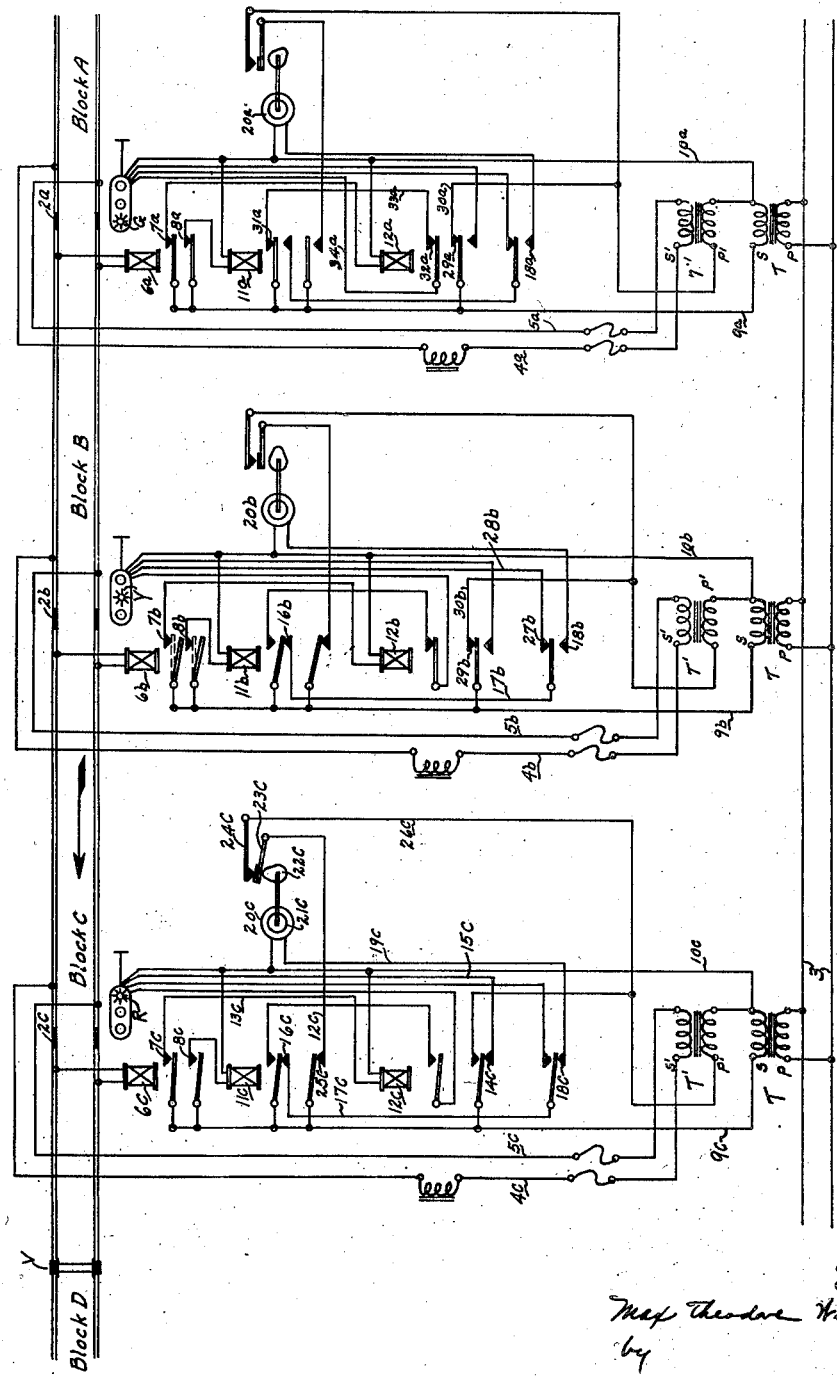
Figure 2:
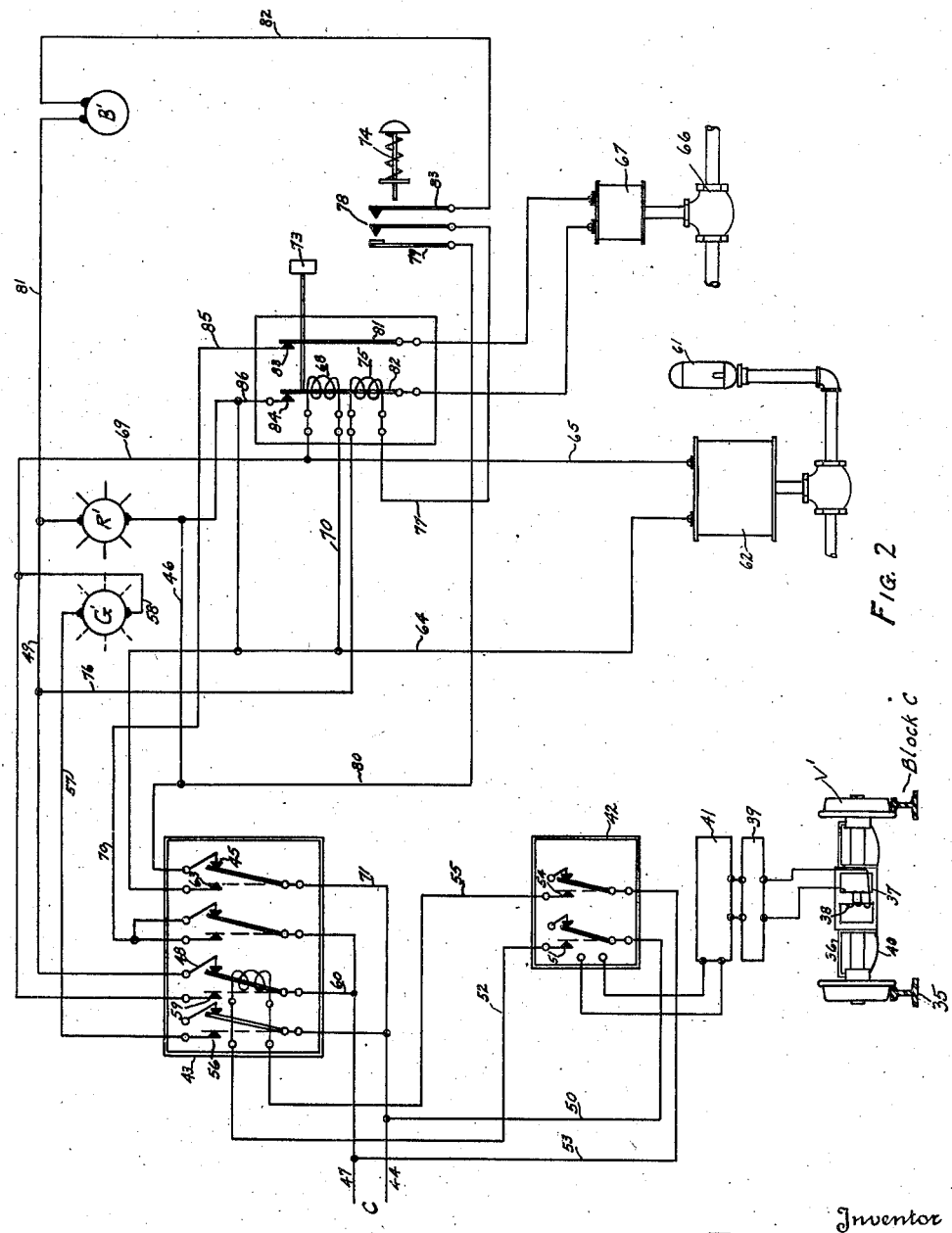

In order that my invention may be more readily understood I will describe the same in connection with the attached drawings, in which Figure 1 is a diagrammatic illustration of a preferred embodiment of my invention applied to a track-way, four block sections being shown; and Figure 2 is a diagrammatic view of a typical cab signal installation.

The track and right-of-way signal current circuits are shown in Figure 1 as applied to blocks A, B, C, and D, each block being separated from the other by insulators 2a, 2b, and 2c. A vehicle V is shown in block D and is assumed to be travelling in the direction of the arrow.

*The track current and right-of-way signal current supply system*

Current for operation of the cab signals and right-of-way signals is supplied from a high voltage transmission line 3 or other suitable source of current. In my preferred embodiment the current is supplied from transmission line 3, through a transformer T having a primary P and a secondary S, providing current of a desired voltage and frequency, say 110 volts at 100 cycles. The secondary of the transformer T supplies current for the operation of the right-of-way signals and a second or track transformer T' is coupled with the transformer T and has primary and secondary windings P' and S' respectively; the secondary current being utilized for the track control current. The current supplied by the secondary S' may be 12 volts at 100 cycles, and is supplied to the track rails of each block section through leads 4 and 5. For the sake of clarity of description, letters are applied to the corresponding parts in each section; the block section letter being used for the various parts related to each block.

The supply of current to the primary of transformer T' is controlled by traffic conditions existing along the right-of-way, thus providing a system in which current of but a single frequency may be employed to indicate a plurality of track conditions.

Referring to the typical example shown in Figure 1 in which block D is occupied by the vehicle V, it will be observed that the vehicle V will shunt the track relay 6c, connected across the track rails of block D at the entrance end thereof, and the relay 6c will be deenergized and contacts 7c and 8c will fall to open position, since no back points of contact are provided. The track relay 6c controls the operation of a pair of timed line relays 11 and 12, each of which receives energizing current from the secondary S of transformer T through leads 9c and 10c. The circuit for supplying current to line relay 11c is through lead 9c and front point of contact 8c to relay 11c, and from the relay 11c to common lead 10c, thence to the other side of the secondary S. Relay 11c is of the timed type and is so constructed and arranged as to release immediately upon failure of energizing current, but is adapted upon supply of current to remain open unless the supply of current continues for a predetermined period, say three seconds, whereupon it will pick up.

Likewise, line relay 12c is controlled by track relay 6c; the energizing current passing from secondary S through lead 9c, contact 7c and lead 13c to the relay and from the relay to common lead 10c, thence to the secondary S. The relay 12c is a timed relay similar to relay 11c, except that it is so constructed and arranged that it does not release for a timed interval, say three seconds, but lifts immediately upon establishment of current in the winding thereof.

It will thus be observed that when a vehicle occupies a given block the track relay 6 connected to the rails of the occupied block and the line relays 11 and 12 controlled by the relay 6 will be deenergized, provided, of course, the current supply is interrupted for a period of time greater than the time lag of the slow release relay 12.

Referring again to the illustrated embodiment, when relay 12c is deenergized, back point of contact 14c transfers current from the secondary S through the lead 9c and a lead 15c to right-of-way signal R which may be suitably colored to indicate a dangerous condition existing in block D; the signal light being positioned at the entrance end of block D. The right-of-way signal is permanently connected by the common lead 10c to the other side of the secondary S.

In order to indicate to a vehicle which may enter block C, the traffic condition illustrated in block D, which lies in advance thereof, current supplied to block C from the secondary S' of the track transformer T' is regularly interrupted so that pulsations of current are supplied to the track rails in block C. This is effectuated only when relays 11c and 12c are deenergized. Current flowing from the secondary S of transformer T is conveyed through lead 9c, back point of contact 16c of relay 11c through lead 17c to back point of contact 18c of relay 12c and thence through lead 19c to a constant speed interrupter, indicated generally at 20c. The interrupter is permanently connected to one side of the transformer T by the common lead 10c so that when relays 11c and 12c are deenergized, the interrupter will be placed in operation. The interrupter comprises a constant speed motor drive 21c, driving a cam 22c which engages a breaker 23c, intermittently closing and opening a contact 24c. A mercuroid switch may be substituted for the switch shown or other suitable breaker may be employed. The speed of revolution of the cam 22c will be determined by the rate of interruption of the current desired. The timing of the interruptions should be predetermined with respect to the timing of the relays 11 and 12. With a 3 second lag in the relays, interruption at the rate of 30 breaks per minute will be found satisfactory. When the interrupter is in operation, circuit for the primary P' of the track transformer T' is intermittently closed through the switch 23c—24c and current supplied from the secondary S of the transformer T is intermittently fed to the primary P'. The current flows from the secondary S through lead 9c, back point of contact 25c of line relay 11c, contacts 23c and 24c, and lead 26c to primary P'; the other side of the primary winding P' being permanently connected to secondary S. This intermittent charging of the primary P' of a track transformer T' results in intermittent excitation of the secondary S', impressing an intermittent supply of current on the track rails of block C through leads 4c and 5c.

Accordingly, when a vehicle occupies a block or the control current supply for that block fails by reason of an open rail, drawbridge or the like, the track relay 6 is deenergized, current is supplied to effect operation of a danger signal R along the right-of-way, provided at the entrance end of the block to warn any approaching vehicle, and control current is intermittently supplied to the track rails of the next rearward block section. The control current may be suitably translated by equipment on the cab of any approaching vehicle into a signal indicating the traffic condition existing in the next advance block.

With intermittently flowing current in track rails of block C, track relay 6b will be alternately energized and deenergized according to the supply and failure of current in block C. Thus, contacts 7b and 8b will be intermittently engaged and disengaged by their appropriate armatures. Immediately upon deenergization of the relay 6b, line relay 11b will be deenergized and, by reason of the timed action which prevents pick up without the continuous supply of current for a predetermined period, which time lag is greater than the period of interruption, the armatures of relay 11b will remain out of engagement with the front points of contact but in engagement with the back points of contact so long as the intermittent supply of current continues. Line relay 12b which is the reverse of line relay 11b will, because of its slow releasing characteristics, remain energized with its armatures and front points of contact in engagement. With line relay 11b deenergized and line relay 12b energized, current for the right-of-way signal will flow from the secondary S of the transformer T through the lead 9b to back point of contact 16b of relay 11b through lead 17b to front point of contact 27b of relay 12b and thence through a lead 28b to a signal light Y which is suitably colored to indicate the existing traffic conditions, which in the illustrated embodiment is the presence of a vehicle V in block D. Current supply for the primary P' of the track transformer T' will then be from the secondary S of transformer T, through lead 9b to front point of contact 29b of relay 12b and lead 30b to primary P'. Thus, control current for block B, supplied from the secondary S' through the leads 4b and 5b to the track rails at the exit end of block B, will be continuous.

With continuous current flowing in the track rails of block B, track relay 6a will be continuously energized and its contacts 7a and 8a will close the circuits for the line relays 11a and 12a. Since the current flow is continuous in the rails of block B, both relays 11a and 12a will remain closed. With both line relays closed, current for energizing the right-of-way signal will flow from the secondary S of a transformer T through lead 9a to front contact 31a of line relay 11a to front point of contact 32a of relay 12a through lead 33a, thence through lead 34a to the signal G which may be suitably colored to indicate a clear traffic condition in blocks B and C. Current, of course, is supplied from the other side of the secondary S of the transformer T through the common lead 10a.

So long as relays 11a and 12a remain energized current is supplied to the primary P' of the track transformer T' from the secondary S of the transformer T through lead 9a, front point of contact 29a and lead 30a and from the other side of secondary S through the common lead 10a. The secondary S' will be continuously charged and current supplied to the track rails of block A through leads 4a and 5a will be continuous.

From the foregoing description, it will be clear that a vehicle in block D will cause a "danger" signal R to be exhibited at the entrance of block D; current will be intermittently supplied to block C; a "caution proceed" signal indication Y will be exhibited at the entrance of block C; current will be supplied continuously to block B and a "clear" indication G will be exhibited at the entrance of block B. In other words, the indication R is presented upon failure of energizing current for track relay 6; the indication Y is presented upon intermittent operation of track relay 6 and the indication G is presented upon continuous energization of track relay 6; operation of track relay 6 being controlled by traffic conditions existing in the trackway in advance.

It will be observed that by utilizing timed relays 11 and 12, three signal indications may be effected to indicate various traffic conditions without the use of tuned relays or tuned circuits. It will be further observed that no line wires are employed; control current being conducted through the rails.

It should be noted that unless the supply of current for the track relay 6 be shunted out by a vehicle or otherwise for a period greater than the time lag of the relay 11, the interrupter 20 will not be placed in circuit. This is clearly illustrated in the embodiment shown in Figure 1, where current supply for the motors 20b and 20a forming part of the interrupter mechanism is cut at contacts 18b and 18a respectively.

If desired, the current supplied to the track rails for operation of the track relays 6 may also be utilized for cab signal control. In the embodiment illustrated, 12 volts at 100 cycles are supplied to the rails through the secondary S' of the track transformer T' through the leads 4 and 5. The current thus supplied may be conveniently transmitted from the rails to suitable signalling and/or control mechanism on the vehicle.

*The current pick up and cab signal circuits*

Referring now to Figure 2, a vehicle V' is shown positioned on a pair of track rails 35. For purposes of illustration, it will be assumed that a vehicle V' is occupying block C of Figure 1 and that current is being supplied to that block at the exit end thereof in an interrupted manner by reason of vehicle V in block D. The vehicle may be provided with any suitable device for picking up the current impressed upon the track rails.

It is preferred to use a direct electrical contact type of pick up such as described in Wintsch Patent No. 1,697,624, issued January 1, 1929, which provides a shunt transformer around the front axle of the vehicle. Another type of pick up which is particularly desirable for use with direct current propelled trains, where electrical interference is prevalent, is shown in Figure 2 and comprises a pair of plates 36 connected to the bearing boxes. Between these plates a core type transformer 37 is positioned and this transformer is provided with a winding 38 leading into a tuner or filter 39. Leads 40 may be provided from the bearing boxes or from brushes operating directly against the train wheels to the transformer core in order that direct line transformation from one end of the axle to the other may be effected. Induction types of pick ups may be employed if desired.

The tuner 39 is adapted to resonate at the frequency of current supplied to the track rails, which in the embodiment being described is 100 cycles. Other types of tuners, such as the band pass type may be employed if desired. The current picked up by the tuner 39 may be fed to an amplifier 41 in order that the current supply may be effectively increased in an amount sufficient to positively operate a master relay 42, although in some instances, where the block sections are not excessively long, the amplifier may not be necessary.

The current picked up from the track rails and fed through the tuner 39 and amplifier 41 is utilized for operation of master relay 42 which relay is responsive to the current supplied to the track rails in the block in which the vehicle is traveling and is effective for operating a control relay 43. In the hypothetical case under consideration, the master relay 42 will be intermittently energized and deenergized at a rate corresponding to the rate of interruption of the track current.

The cab signal comprises, in the illustrated embodiment of this invention, a pair of signal lights R' and G' which may be colored red and green, to indicate track conditions. With a vehicle occupying block D and the vehicle under consideration operating in block C, the preferred "caution proceed" signal is effectuated by alternately lighting and extinguishing the colored lights R' and G'. The rate of flashing of these lights is controlled by the rate of interruptions of current supplied to the track rails. Current for effecting energizing of the signals R' and G' is supplied from a suitable source of current C and the supply of current from this source to the signal lights is controlled by the control relay 43 which is responsive to the master relay 42. When the master relay 42 and the control relay 43 are deenergized by reason of failure of the track current, even for relatively short periods during interruption, signalling current passes through lead 44 from the source of signalling current C through back point of contact 45 of control relay 43 through lead 46 to the signal light R'. Current passes from the other side of the source C through lead 47, back point of contact 48 of control relay 43 and lead 49.

When the master relay 42 closes by reason of supply of control current in the rails, current for energizing the control relay 43 is supplied through a lead 50 connected to the source C, through front point of contact 51 of master relay 42 and lead 52 to the operating winding of the control relay 43. The circuit is completed through lead 53, front point of contact 54 of the master relay 42 and lead 55. It will be understood, therefore, that energization of the master relay 42 effects energization of the control relay 43, so that when current is flowing in the track rails the control relay will be energized. When the control relay is energized, signalling current passes from the source C through lead 46, front point of contact 56 and lead 57 to the signal light G'. The circuit is completed through lead 58 to front point of contact 59 of control relay 43 and lead 60 to the other side of the source of current. Signal light G' is, therefore, illuminated when current is supplied to the track rails and picked up by the master relay 42. When the master relay 42 is deenergized, control relay 43 is also deenergized and signal G' is extinguished.

It will be apparent, therefore, with the vehicles occupying the relative positions stated above in the hypothetical example under consideration, signal lights R' and G' on the vehicle V' which occupies block C will be alternately illuminated to indicate that vehicle V occupies block D.

If desired, a signal such as a whistle may be provided on the cab in addition to the colored lights. In the embodiment shown in Figure 2, a whistle 61 is controlled by a solenoid type valve 62 which is normally held in closed position so that the whistle does not function when current is supplied to the control solenoid 62. The operation of the whistle is governed by control relay 43. Current is conveyed from the source C by the lead 44, front point of contact 63 of the control relay 43 and lead 64. The current supply circuit is completed through lead 65 to front point of contact 59 of control relay 43 and lead 60 to the source of current. Immediately upon deenergization of the control relay 43, indicating a restrictive traffic condition, the control valve 62 will open and the whistle 61 will sound, the current supply for the solenoid 62 having been opened at contact 63. Since current is being interruptedly supplied to indicate a "caution proceed" condition, the whistle 61 will be intermittently operated in blasts corresponding to the time of deenergization of the master and control relays.

A suitable brake application valve may be provided to automatically stop the train in the event of a restrictive traffic condition. An operator's reset button or switch may also be provided to acknowledge the existence of a restrictive traffic condition and to prevent the application of the automatic braking mechanism.

The brake operating mechanism as illustrated comprises a valve 66 operated by a solenoid 67. The valve is preferably inter-connected with the vehicle braking system and exhausts to atmosphere, gradually applying the vehicle brakes. The solenoid 67 is effective for normally holding the brake applying valve closed, and deenergization thereof results in opening of the valve. Any suitable speed control or brake applying device may be substituted, however, for the mechanism shown. The solenoid 67 is controlled through a relay 68 which is inter-connected with the control relay 43. In order to prevent intermittent operation of the braking mechanism by reason of the existence of a "caution proceed" condition, the relay 68 is preferably timed so as to release only after deenergization has been effected for a predetermined period of time, which time lag is greater than the period of time of deenergization of the control relay when pulsations of current, as above described, are supplied thereto. In the hypothetical example, described above, the brake valve 67 on vehicle V' in block C would be energized by reason of the fact that the pulsating current which is supplied to the rails and through master relay 42 and control relay 43 to the relay 68 is not interrupted for a period of time sufficient to overcome the predetermined time lag of relay 68. So long as the supply of current is continuous or intermittently supplied in pulsation of the character described above, the coil 68 will be energized, deriving current from the source C through leads 47 and 60, front point of contact 59 and lead 69; the circuit being completed through lead 70 and front point of contact 63 of the control relay 43 and a lead 71 connected with lead 44 to the source C.

So long as interrupted current is supplied to the track rails occupied by a vehicle, the signal lights will be alternately illuminated, the whistle will be blown in intermittent blasts, but the brakes will not be automatically applied. Now, assuming for illustrative purposes that vehicle V' should enter occupied block D, the vehicle V will have shunted out the control current and since no current passes to the master relay 42 on vehicle V', control relay 43 will be deenergized and the signal R' illuminated indicating a dangerous condition and the whistle 61 will be blown continuously. The circuits for the light R' and the whistle control valve 62 have been described above.

Since control relay 43 is deenergized for a period of time greater than the time lag of the brake relay 68, after the predetermined lag, it will open resulting in breaking of the current supply for the brake valve 67. The brakes will then be applied by valve 66.

The brake control relay 68 is counterweighted at 73 in order that upon its deenergization it will move into an open position and must be manually reset, thus assuring that the vehicle operator will recognize the dangerous condition of the trackway in advance. In order to avoid the application of the vehicle brakes, an operator's acknowledging button 74 is provided which is adapted to hold the brake control relay 68 in closed position even though the normal supply of current thereto be broken. This is effected by means of a relay 75 which derives its current from source C through lead 60, back point of contact 48 and lead 76, to the coil, and from the coil through lead 77 to a switch contact 78 which is engageable with a contact 79, connected to back point of contact 45 by a wire 80. Lead 71 carries current from the source C to contact 45. It will be observed that the contact switch 78 engages the switch 79 only in the event the button 74 is pressed.

In order to provide an indication to the fireman or passengers that the operator of the vehicle has acknowledged a restrictive condition, an acknowledging light B' may be provided in the car or other suitable location. This light is connected to one side of the source of current C through the leads to the signal R' and a lead 81. The other side of the light is connected through a lead 82 to a switch contact 83 forming part of the operator's acknowledging switch, thus current is supplied for energization of the signal B' only when the operator's acknowledging button is pressed.

The acknowledging arrangement may be conveniently modified to include the whistle 61 and the control solenoid 62 by placing the solenoid in series with the brake application solenoid 67. If this be effectuated, then upon application of the acknowledging button the whistle will cease to blow and the brakes will no longer be applied, since operation of the acknowledging button closes the circuit for both of the solenoid controls 62 and 67.

As pointed out above, the relay 68 is of the slow release type so that the vehicle operator has a short period of time after the signal R' indicates a danger condition before the relay 68 will cause application of the vehicle brakes. This gives the operator sufficient time to press the acknowledging button and bring relay 75 into circuit to hold the armatures 81 and 82 of relay 68 in engagement with contacts 83 and 84 respectively, current being supplied continuously to the contacts 83 and 84 through leads 85 and 86 suitably connected to the source of current C.

In order to illustrate the operation of the cab signal when a clear condition exists, it will be assumed that vehicle V' occupies block B, which lies two blocks away from occupied block D, and has a continuous supply of 12 volt 100 cycle current impressed upon its track rails. Master relay 42 and control relay 43 will be energized; signal light G' will be illuminated; whistle control valve 62 will be energized and brake control relay 67 will be energized. The circuits for the relays, signal and control valves are described above.

It will be understood that my invention is applicable to trackway where no cab signals are provided for the vehicle operator. The right-of-way signal system may be utilized to advantage either with or without cab signal mechanism, although the system is particularly desirable since it permits ready inter-connection of the cab signal and right-of-way circuits and eliminates all interference from tuned circuits.

A two light, three indication cab signal has been shown. Other cab signals may be employed if desired. If a three light, three indication signal is desired, for example, a circuit similar to that employed for the right-of-way signals may be utilized. This would require a pair of timed relays similar to relays 11 and 12 to be utilized in addition to master relay 42, and instead of having alternately flashed lights R' and G' a third light suitably colored would be illuminated when the control current is interruptedly supplied.

The simplicity of the system will be clear from the foregoing description and the advantages of my system will be evident to those skilled in the art. The elimination of block to block line wires; the elimination of tuned right-of-way signal circuits and relays; the elimination of coders and decoders and associated relays and the provision of a three indication signal with but a single tuned relay are some of the advantageous features of my invention which, while clear from the disclosure, are here mentioned.

While I have illustrated and described the present preferred embodiment of my invention, it will be understood that my invention is not so limited but may otherwise be practiced and embodied within the scope of the following claims.

I claim:

1. In a signal system for rail vehicles, a pair of track rails, a source of electrical energy, means for impressing said electrical energy upon the rails, means responsive to the supply of said energy and effective for initiating a signal indication, means responsive to failure of said energy to initiate a second signal, and means effective upon regular interrupted supply of said energy to initiate a third signal, said means including a timed, slow pick-up relay and a timed, slow release relay, said slow pick-up relay having a time lag greater than the time period of electrical energy supply and the slow release relay having a time lag greater than the time period of failure of such supply.

2. In a signal system for rail vehicles, a pair of track rails, means for impressing electrical control energy upon the rails, a timed, slow release relay and a timed, slow pick up relay responsive to said control energy and controlling a signal, and means for regularly interrupting the supply of control energy at such rate that the time period of electrical energy supply is less than the time lag of said slow pick-up relay and the time period of failure of such supply is less than the time lag of said slow release relay, whereby one of said relays will be released and the other held up to effect control of said signal.

3. A signal system comprising a pair of track rails, means for impressing control current upon said rails, a relay responsive to said current, a timed, slow release relay and a timed, slow pick up relay controlled by said first mentioned relay, a signal initiated upon release of one of said timed relays and pick up of the other, and means for regularly interrupting the current supply for the track rails at such rate that the time period of current supply is less than the time lag of said slow pick-up relay and the time period of failure of such supply is less than the time lag of said slow release relay, whereby one of said relays will be released and the other held up to effect control of said signal.

4. In a signalling system for rail vehicles, a pair of track rails, a source of track current, a track relay responsive to supply and failure of the track current, a timed, slow release relay, a timed, slow pick up relay, each of said relays being controlled by said track relay, a signal in circuit with said timed relays and adapted to be energized upon release of one of said relays and pick up of the other, and traffic controlled means for regularly interrupting the track current at such rate that the time period of current supply is less than the time lag of said slow pick up relay and the time period of failure of such supply is less than the time lag of said slow release relay, whereby one of said relays will be released and the other held up to effect control of said signal.

5. In a signalling system for rail vehicles, a pair of track rails, a source of control current, a relay responsive to the control current, a pair of timed relays, one of which will pick up and the other release upon the energization and deenergization of said first mentioned relay for regular periodic intervals, a signal responsive to said timed relays, and means for regularly interrupting the control current at such rate that the time period of current supply is less than the time lag of said slow pick up relay and the time period of failure of such supply is less than the time lag of said slow release relay, whereby one of said relays will be released and the other held up to effect control of said signal.

6. A way-side signal comprising a pair of track rails divided into a plurality of block sections, means for impressing control current upon said rails at each block section, a constant speed interrupter, traffic controlled means effective for placing said interrupter in the circuit carrying the control current to the track rails, whereby control current supplied by the track rails in a block section is regularly interrupted, and translation means adapted to translate the interrupted control current into a signal, said translation means including a timed, slow pick up relay and a timed, slow release relay, said slow pick up relay having a time lag greater than the time period of current supply and the slow release relay having a time lag greater than the time period of failure of such supply, said translation means being adapted to control energization of a signal upon release of both of said relays, energization of a second signal upon pick up of both of said relays and energization of a third signal upon release of one and pick up of the other of said relays.

7. In an automatic signal system for rail vehicles, a pair of track rails divided into block sections, means for impressing electrical current upon the rails of each section, a signal responsive to the current supplied to the rails, a second signal responsive to failure of said current and a third signal responsive to timed interruptions of said current, said last named signal being controlled by relays which are responsive to the current in the rails, one having a timed lag greater than the time of periodic supply, and the other having a timed lag greater than the time of periodic failure of said current, when said current is being supplied to the rails periodically to indicate the third signal.

8. In an automatic train signal system, a pair of track rails insulated from one another and divided into block sections, a way-side signal indicating a plurality of track conditions and located at each block section, means at each block section effective for supplying electrical energy to one end of the block section in accordance with variations in electrical energy present in the adjacent end of the other block section, said means including a repeater relay, a slow pick up relay, a slow release relay, and means for interrupting electrical energy at such rate that the time period of electrical energy supply is less than the time lag of said slow pick-up relay and the time period of failure of such supply is less than the time lag of said slow release relay, whereby one of said relays will be released and the other held up to effect control of said signal, the repeater relay being effective for transmitting to said timed relays energizing electrical current in accordance with the character of current received by the repeater relay from the track rails, and said timed relays determining the character of current fed to the track rails and to the wayside signal in accordance with the character of current supplied to the repeater relay whereby upon supply of interrupted electrical energy to the repeater relay one of said timed relays will be in closed position and the other in open position and a circuit will be completed for the supply of current to the track rails and to the wayside signal.

9. In an automatic train signal system, a plurality of insulated track rails divided into block sections, a source of electrical energy at each block section, means for periodically supplying the electrical energy to the sections in regular impulses, control means for said supplying means, the control means being responsive to traffic conditions in an advance block section, means for feeding the current impulses to a block section other than the controlling block section, and means controlled by the current impulses for energizing a signal, including a relay having a time lag greater than the time period of current supply and a second relay having a time lag greater than the time period of failure of current during periodic supply thereof.

MAX THEODORE WINTSCH.